United States Patent Office
3,415,747
Patented Dec. 10, 1968

3,415,747
SOLUTION TREATMENT
David N. Glew, Sarnia, Ontario, Canada, assignor to The Dow Chemical Company, Midland, Mich., a corporation of Delaware
No Drawing. Filed Mar. 8, 1965, Ser. No. 438,107
21 Claims. (Cl. 210—59)

ABSTRACT OF THE DISCLOSURE

This invention relates to a process for concentrating aqueous solutions and simultaneously producing potable water by contacting, at a pressure no greater than 50 p.s.i.g., an aqueous solution with a hydrate-forming, water soluble material to form a homogenous solution, reducing the temperature of such homogeneous solution to form a solid hydrate, separating the concentrated aqueous solution from the solid hydrate, decomposing the solid hydrate, to regenerate the hydrate-forming material and separating the water from the hydrate-forming material.

---

This invention relates to a method for concentrating aqueous solutions and concomitantly producing relatively pure and potable water; more particularly it relates to a process for concentrating aqueous solutions by utilizing a water-miscible hydrate forming agent as the water remover through the formation of a separable solid hydrate.

While it is known that certain materials form hydrates with water and while certain water-insoluble, immiscible materials have been used to concentrate aqueous solutions by the formation and removal of a hydrate with water, the water-miscible hydrate formers have not been used for this purpose nor have their remarkable advantages been discovered before.

The hydrate formers used in the past were immiscible and only slightly soluble in the aqueous solutions which they concentrated. This severely limited the quantity of separable hydrate which could be prepared per pass. Also operating pressures in the range of 100 to 1000 p.s.i. were required for the conventional gaseous hydrate formers. Crystal formation was relatively difficult and only small crystals were formed.

It is therefore a principal object of the present invention to provide a new novel and useful method for concentrating aqueous solutions and for recovering potable water therefrom.

It is an additional object of the present invention to provide a method for removing water from aqueous solutions at readily obtainable temperatures and pressures.

Another object of the present invention is to provide a method for concentrating the solute in a water solution and simultaneously recovering useful water therefrom in an inexpensive manner adapted for continuous operation. It is a further object of the present invention to provide a method for the concentration of aqueous solutions containing compounds which are sensitive to heat and cold such as natural fruit juices, dilute alcoholic beverages, dilute coffee and tea extracts, blood, biological protein solutions, solutions of antibacterial or antibiotic substances derived from fermentation processes, heat sensitive dye stuffs, those solutions that are easily hydrolyzable and the like without producing the unwanted side effects normally encountered through the use of conventional concentration methods.

It is a further object of the present invention to achieve rapid and extensive concentration of the solute and simultaneously to produce relatively large volumes of pure water with each pass through the reaction system. Other objects and advantages of the method of the present invention will become apparent from the detailed description presented hereinafter.

In carrying out the process of the present invention, a water-soluble hydrate-forming gas or liquid is contacted with a dilute aqueous solution at substantially atmospheric temperature and pressure. The mixture is cooled under autogenous pressure until the solid hydrate is formed and precipitated out. The resulting hydrate is separated from the solution and is decomposed by increasing the temperature and/or decreasing the pressure to yield the hydrate forming material and free water. The water-soluble hydrate-former may then be recycled for subsequent hydrate formation. It is necessary, of course, that the hydrate-former be inert to the solute of the solution being treated. Specifically, one exemplification of the process of the present invention involves contacting a dilute brine solution containing 3.5 weight percent sodium chloride with ethylene oxide to form a solution in which the water to ethylene oxide mole ratio is 6.8 to 1. The ternary mixture of salt, water and ethylene oxide was cooled. At a temperature of 8.1° C., the ethylene oxide hydrate precipitated as large crystals and continued to form at this temperature until the mixture had reached the salt concentration of 5.4 percent by weight based upon the water present. The large ethylene oxide hydrate crystals were filtered and washed with a small amount of salt-free aqueous ethylene oxide at about 11° C. The hydrate was then separated and melted at about 12° C. to yield an aqueous ethylene oxide solution which was separated by distillation to give gaseous ethylene oxide overhead and a salt-free water product as bottoms. Distillation of the concentrated aqueous salt filtrate produced ethylene oxide overhead and a concentrated 5.4 percent brine as bottoms. A concentration was therefore effected from a 3.5 weight percent aqueous sodium chloride solution to a 5.4 weight percent sodium chloride solution whereby salt-free water was produced concomitantly. The recovered ethylene oxide was suitable for recycling.

As can be seen by this illustration, only moderate temperatures and pressures need be employed for this process and extensive concentration and pure water production can be affected in a single operating cycle. An additional and unexpected advantage is the formation in the process of very large size hydrate crystals with small surface area to volume ratio. These crystals are particularly convenient for filtration and occlude only small quantities of the aqueous salt solution which may be easily removed by washing. The water produced thereby is of an unexpectedly high quality due to this formation of large crystals and the very slight entrapment of solute-containing water.

This process may be used as either a batch or continuous process and is easily adapted to large scale continuous industrial use.

Gaseous and liquid hydrate-formers useful in the method of the present invention may be selected from a wide variety of water-soluble organic and inorganic hydrate-forming materials. For example, ethylene oxide, propylene oxide, tetrahydrofuran, dihydrofuran, dimethyl ether, trimethylamine, ethylamine, diethylamine, isopropylamine, sulfur dioxide, meso-2,3-butanediol, pinacol, acetone and the like. These water-soluble hydrate-formers are known compounds known to form hydrates.

This process is easily adapted to either batch or continuous use. The gaseous or liquid water-soluble hydrate-former may be continuously added to a flowing stream of the solution to be treated. This mixture may then be continuously passed through a cooler where the hydrate crystals are formed and then passed through a separator to continuously wash and remove the hydrate crystals. The filtrate containing a higher solute concentration may be continuously stripped to remove any remaining hydrate-former so that the stripped solution may be removed from the system while the hydrate-former is recycled. The separated hydrate crystals may then be continuously melted, the fresh water and hydrate-former separated by stripping with steam, insert gas or reduced pressure, distillation, flashing, solvent extraction and the like and the hydrate-former recycled to the system. Typical illustrations of the batch systems are illustrated in the examples.

Solutions which may be concentrated and/or from which water may be removed by the use of this method include virtually any dilute aqueous electrolyte and aqueous non-electrolyte solutions from which large amounts of water are to be removed. Representative aqueous solutions which can be concentrated by the novel method of the present invention include, for example, natural brines, sea water, brackish water, solutions of lithium chloride, potassium chloride, ammonium chloride, potassium bromide, potassium iodide, barium chloride, magnesium sulfate, hydrochloric acid, methyl alcohol, ethyl alcohol, ethylene glycol, acetic acid, dioxane, glucose, urea, ethyl urethane, glycerine, milks, monosaccharides, disaccharides, penicillins, and other biologically active fermentation products, amino acids, proteins and the like. This method has little utility for removing small quantities of water from highly concentrated solutions but is especially useful for extracting water from dilute electrolyte solutions containing from about 1 to about 30 or 40 grams of solute per 180 grams of water. Such concentration is possible at moderate temperatures such that temperature sensitive materials or easily decomposable valuable solutions are not damaged in the process. Such a process will therefore have a very wide application for virtually any dilute solute-containing water solution.

This method can also be used to precipitate salts which have only a limited solubility in water, e.g. $NaHCO_3$, $Na_2SO_4 \cdot 10H_2O$, $Na_2B_4O_7 \cdot 10H_2O$, $KClO_3$,

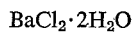
$BaCl_2 \cdot 2H_2O$ and the like, wherein the solid hydrate can be separated from the precipitated salt using differential flotation or centrifugal separation techniques.

The maximum temperature for the hydrate-forming step of the present invention is that temperature above which a separable hydrate cannot be formed in the presence of the water solution. Preferably, a hydrate-former will be selected which may be used near to room temperature, i.e. from about 4 to about 11° C., in order that the process may be run at easily obtainable temperatures. If other considerations dictate, a liquid or gaseous hydrate-former may be selected which is soluble in water and which can be employed to form a hydrate at temperatures as low as about —20 or as high as about 45° C. Lower limits of operating temperatures which can be utilized are generally those temperatures at which ice forms in the aqueous solution being treated, and the upper limit is generally the point of decomposition of the hydrate. This corresponds to the temperature of formation. The following Table I illustrates some typical water soluble hydrate-formers. The maximum temperature at which they will form a hydrate, and the composition of the hydrate formed at this temperature are shown.

TABLE I

| Hydrate Former | Hydrate | Maximum temperature for hydrate formation (° C.) |
| --- | --- | --- |
| Pinacol | $C_6H_{14}O_2 \cdot 6H_2O$ | 45.4 |
| Meso-2,3-butane diol | $C_4H_{10}O_2 \cdot 6H_2O$ | 17.5 |
| Ethylene oxide | $C_2H_4O \cdot 6.8H_2O$ | 11.1 |
| Trimethylamine | $C_3H_9N \cdot 10H_2O$ | 6.0 |
| Tetrahydrofuran | $C_4H_8O \cdot 17H_2O$ | 4.4 |
| Isopropylamine | $C_3H_9N \cdot 8.1H_2O$ | —4.5 |
| Diethylamine | $C_4H_{11}N \cdot 6.8H_2O$ | —6.6 |
| Ethylamine | $C_2H_7N \cdot 5.5H_2O$ | —7.5 |
| Acetone | $C_3H_6O \cdot 17H_2O$ | —14 |

While pressure is not a critical part of this invention, autogenous pressure is generally used. Any pressure in the range from atmospheric to 50 p.s.i.g. may be used, however.

The following examples will serve to further illustrate the process of the present invention without limiting it thereto.

Example 1

An aqueous sodium chloride solution consisting of 96.4 parts by weight of water and 3.6 parts by weight of sodium chloride was treated with 35.5 parts of ethylene oxide at 9.5° C. to form a homogeneous aqueous solution. The solution was cooled and stirred under autogenous pressure at about 9.1° C. where first precipitation of the solid ethylene oxide hydrate occurred. As the temperature was reduced, the quantity of hydrate increased and the crystals grew in size. At about 8.3° C. the homogeneous solution consisted of 69.9 parts of water, 3.6 parts sodium chloride, and 26.5 parts ethylene oxide. The solid ethylene oxide hydrate phase amounted to 35.5 parts by weight and was separated from the salt-containing mother liquor and was washed with aqueous ethylene oxide (containing about 27% ethylene oxide) at about 11° C. The thus separated hydrate was melted at 14° C. to give a salt-free homogeneous aqueous ethylene oxide solution which was flash distilled at a pressure of 15 p.s.i.g. to yield ethylene oxide overhead and a pure water product as residue. The concentrated salt solution mother liquor was then cooled further to 8.2° C. where more ethylene oxide hydrate crystals began to precipitate. When the temperature reached about 7° C. the homogeneous solution consisted of 45.9 parts water, 3.6 parts sodium chloride and 16.8 parts ethylene oxide with the ethylene oxide hydrate phase consisting of 28.0 parts. The hydrate was then separated from the mother liquor by filtration and washed with an aqueous ethylene oxide solution as before. The hydrate was then melted and steam stripped in a column at a pressure of about 15 p.s.i.g. to produce ethylene oxide overhead and a substantially pure water product at the bottom. The concentrated salt solution was stripped free from ethylene oxide in a column run at about 15 p.s.i.g. and yielded an aqueous sodium chloride solution containing about 7.1 weight per cent sodium chloride. This concentration may be accomplished either in a single stage in which the temperature is lowered sufficiently to produce high concentrations or it may be done in multiple phases to accomplish substantially the same results.

Example 2

An aqueous ethyl alcohol solution containing 93.9 parts of water and 6.1 parts ethyl alcohol was mixed with 34.4 parts of ethylene oxide at 9.5° C. to form a homogeneous solution which was stirred by recirculation through a pump. The solution temperature was slowly reduced and at 8.7° C. solid ethylene oxide hydrate crystals first precipitated. The solution was slowly cooled. At 8.2° C. approximately 27 parts of ethylene oxide hydrate were separated from the mother liquor on a filter as the alcohol containing mother liquor was further cooled slowly to about 7.5° C., about 20 parts of ethylene oxide hydrate precipitated and separated from the concentrated mother liquor. This concentrated mother liquor was again slowly cooled to about 6.8° C. At this point additional ethylene oxide hydrate crystals constituting about 14 parts were separated from the concentrated mother liquor. The concentrated alcohol solution was now found to contain 47 parts water, 16 parts ethylene oxide and 6.1 parts ethyl alcohol. This material was distilled at atmospheric pressure to yield ethylene oxide overhead and an aqueous ethyl alcohol solution bottoms containing 11.5 weight percent ethyl alcohol. All of the ethylene oxide hydrate crystals were combined and melted together to give a homogeneous solution which was distilled at atmospheric pressure to give ethylene oxide overhead and the residue consisting of potable water with only trace amounts of ethyl alcohol.

Example 3

In order to demonstrate the applicability of this process to a wide variety of solute-containing water solutions various concentrations of various organic and inorganic solutes were concentrated by following the general procedure of Example 1. The results of these experiments are to be found in the following Table II.

TABLE II.—CONCENTRATIONS ACHIEVED BY HYDRATE FORMATION FROM SOLUTION

| Hydrate former | Mole percent hydrate former relative to $H_2O$ in original solution | Initial solute | Initial solute concentration | Final wt. percent solute relative to water at temp. | (° C.) |
| --- | --- | --- | --- | --- | --- |
| $C_2H_4O$ | 13 | | | 0 | 11.1 |
| $C_2H_4O$ | 3.6 | NaCl | | 4.8 | 2.4 |
| $C_2H_4O$ | 3.6 | NaCl | | 9.1 | 0.5 |
| $C_2H_4O$ | 13 | NaCl | | 4.8 | 5.7 |
| $C_2H_4O$ | 13 | NaCl | | 9.1 | 1.8 |
| $C_2H_4O$ | 13 | NaCl | | 24.9 | −7.3 |
| $C_2H_4O$ | 3.6 | $CH_3OH$ | | 8.3 | −0.5 |
| $C_2H_4O$ | 13 | $CH_3OH$ | | 8.3 | 6.6 |
| $C_2H_4O$ | 69 | $CH_3OH$ | | 8.3 | 1.6 |
| $C_2H_4O$ | 13 | $CH_3OH$ | | 16.9 | 1.5 |
| $C_2H_4O$ | 13 | $CH_3OH$ | | 31 | −9.0 |
| $C_2H_4O$ | 13 | $C_2H_5OH$ | | 6.1 | 8.8 |
| $C_2H_4O$ | 13 | $HOC_2H_4OH$ | | 15.0 | 6.3 |
| $C_2H_4O$ | 13 | Dextrose | | 20.3 | 8.7 |
| $C_2H_4O$ | 13 | Dioxane | | 20.0 | 6.7 |
| $C_2H_4O$ | 13 | Urea | | 14.5 | 6.6 |
| $C_2H_4O$ | 13 | Ethyl urethane | | 20.2 | 7.5 |
| $C_2H_4O$ | 13 | LiCl | | 5.7 | 6.3 |
| $C_2H_4O$ | 13 | KCl | | 9.6 | 7.2 |
| $C_2H_4O$ | 13 | $NH_4Cl$ | | 7.0 | 7.4 |
| $C_2H_4O$ | 13 | $BaCl_2$ | | 19.2 | 6.7 |
| $C_2H_4O$ | 13 | KBr | | 14.4 | 7.4 |
| $C_2H_4O$ | 13 | KI | | 19.0 | 6.7 |
| $C_4H_8O$ | 5.6 | | | 0 | 4.4 |
| $C_4H_8O$ | 5.6 | NaCl | | 3.5 | 2.4 |
| $C_4H_8O$ | 5.6 | KBr | | 8.3 | 2.0 |
| $C_4H_8O$ | 5.6 | $CH_3OH$ | | 4.7 | 1.9 |
| $C_4H_8O$ | 5.6 | $HOC_2H_4OH$ | | 8.7 | 1.6 |
| $C_4H_8O$ | 5.6 | Dioxane | | 11.9 | 2.0 |

I claim:

1. A process for concentrating relatively dilute aqueous solutions and concomitantly producing pure and potable water which comprises (1) contacting, at a pressure no greater than 50 p.s.i.g., a dilute aqueous solution with a hydrate-forming water-soluble material to form a homogeneous solution, (2) reducing the temperature of the homogeneous solution to a temperature which is above the ice freezing point of the aqueous solution and at which a substantial amount of solid hydrate is produced, (3) separating the resulting relatively concentrated aqueous solution from said solid hydrate, (4) decomposing said solid hydrate to thereby regenerate said hydrate-forming material, and (5) separating water from said hydrate-forming material.

2. A process for concentrating relatively dilute aqueous solutions and concomitantly producing pure and potable water which comprises (1) contacting, at a pressure no greater than 50 p.s.i.g., a dilute aqueous solution with a water-soluble hydrate-forming agent selected from the group consisting of gaseous and liquid hydrate-forming materials to produce a homogeneous solution, (2) reducing the temperature of said homogeneous solution to a temperature which is above the ice freezing point of the aqueous solution and at which a substantial amount of solid hydrate is produced, (3) separating the resulting relatively concentrated aqueous solution from said solid hydrate, (4) decomposing said solid hydrate to thereby regenerate said hydrate-forming material, and (5) separating the water from said hydrate-forming material.

3. A process for concentrating relatively dilute aqueous solutions and concurrently producing pure and potable water therefrom which comprises (1) contacting, at a pressure no greater than 50 p.s.i.g., a dilute aqueous solution with a water-miscible hydrate-forming agent selected from the group consisting of gaseous and liquid hydrate-forming materials to form a homogeneous solution, (2) reducing the temperature of the homogeneous solution to a temperature above the ice freezing point of the aqueous solution and at which a substantial amount of solid hydrate is produced, (3) separating the resulting relatively concentrated aqueous solution from said solid hydrate, (4) decomposing said solid hydrate by increasing the vapor pressure of said hydrate to a point such that decomposition of said hydrate occurs thereby regenerating said hydrate-forming material, and (5) separating said water from said hydrate-forming material.

4. A process for concentrating relatively dilute aqueous solutions and concomitantly producing pure and potable water which comprises (1) contacting, at a pressure no greater than 50 p.s.i.g. and a temperature above the ice freezing point of the aqueous solution and above the maximum temperature at which the hydrate is stable, a dilute aqueous solution with a water-soluble hydrate-forming material to form a homogeneous solution, (2) reducing the temperature of said homogeneous mixture to a temperature above the freezing point of the aqueous solution and at which a substantial amount of solid hydrate is produced, (3) separating the resulting relatively concentrated aqueous solution from said solid hydrate, (4) decomposing said solid hydrate by increasing the vapor pressure of said hydrate relative to the atmospheric pressure surrounding said hydrate to a point such that decomposition of said hydrate occurs thereby regenerating said hydrate-forming material, and (5) separating said water from said hydrate-forming material.

5. The process of claim 4 wherein said hydrate-forming material is gaseous.

6. The process of claim 4 wherein said hydrate-forming material is a liquid.

7. The process of claim 4 wherein the water-soluble hydrate-forming material is ethylene oxide.

8. The process of claim 4 wherein the water-soluble hydrate-forming material is tetrahydrofuran.

9. The process of claim 4 wherein the dilute aqueous solution is a sodium chloride brine.

10. The process according to claim 4 wherein the dilute aqueous solution contains as the solute $C_2H_5OH$.

11. The process of claim 4 wherein the dilute aqueous solution contains as the solute $CH_3OH$.

12. The process of claim 4 wherein the dilute aqueous solution contains as the solute ethylene glycol.

13. The process of claim 4 wherein the dilute aqueous solution contains as the solute dioxane.

14. The process of claim 4 wherein the dilute aqueous solution contains as the solute urea.

15. The process of claim 4 wherein the dilute aqueous solution contains as the solute ethyl urethane.

16. The process of claim 4 wherein the dilute aqueous solution contains as the solute lithium chloride.

17. The process of claim 4 wherein the dilute aqueous solution contains as the solute potassium chloride.

18. The process of claim 4 wherein the dilute aqueous solution contains as the solute barium chloride.

7

19. The process of claim 4 wherein the dilute aqueous solution contains as the solute ammonium chloride.

20. The process of claim 4 wherein the dilute aqueous solution contains as the solute potassium bromide.

21. The process of claim 4 wherein the dilute aqueous solution contains as the solute potassium iodide.

References Cited

UNITED STATES PATENTS 3,058,832  10/1962  Glew _____ 210—59 X
3,066,096  11/1962  Blomquist _____ 210—59

8

OTHER REFERENCES

Betz Handbook of Industrial Water Conditioning, Betz Laboratories, Inc., Phila. 24, Pa., fifth edition, 1957, pp. 23–25. Relied on (copy in group 176).

MICHAEL E. ROGERS, *Primary Examiner.*

U.S. Cl. X.R.

62—58